US010811721B2

(12) United States Patent
Minagata et al.

(10) Patent No.: US 10,811,721 B2
(45) Date of Patent: Oct. 20, 2020

(54) ACCUMULATOR DEVICE

(71) Applicant: KABUSHIKI KAISHA TOYOTA JIDOSHOKKI, Kariya-shi, Aichi-ken (JP)

(72) Inventors: Atsushi Minagata, Kariya (JP); Motoaki Okuda, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 866 days.

(21) Appl. No.: 14/784,102

(22) PCT Filed: Apr. 15, 2014

(86) PCT No.: PCT/JP2014/060668
§ 371 (c)(1),
(2) Date: Oct. 13, 2015

(87) PCT Pub. No.: WO2014/171436
PCT Pub. Date: Oct. 23, 2014

(65) Prior Publication Data
US 2016/0056495 A1    Feb. 25, 2016

(30) Foreign Application Priority Data
Apr. 16, 2013 (JP) .................. 2013-085972

(51) Int. Cl.
*H01M 10/04* (2006.01)
*H01M 2/34* (2006.01)
(Continued)

(52) U.S. Cl.
CPC ........ *H01M 10/0413* (2013.01); *H01G 11/12* (2013.01); *H01G 11/80* (2013.01);
(Continued)

(58) Field of Classification Search
CPC ........... H01M 10/0413; H01M 10/345; H01M 2/0237
See application file for complete search history.

(56) References Cited

U.S. PATENT DOCUMENTS 5,549,982 A * 8/1996 Akagi ................ H01M 8/2425
429/456
6,544,684 B2    4/2003 Onishi et al.
(Continued)

FOREIGN PATENT DOCUMENTS

CN       102005602 A    4/2011
JP       2001-307760 A  11/2001
(Continued)

OTHER PUBLICATIONS

International Preliminary Report on Patentability dated Oct. 20, 2015, issued by the International Bureau in corresponding International Application No. PCT/JP2014/060668.
(Continued)

*Primary Examiner* — Robert S Jones, Jr.
*Assistant Examiner* — Rachel L Zhang
(74) *Attorney, Agent, or Firm* — Sughrue Mion, PLLC

(57) ABSTRACT

The electricity storage device includes an electrode assembly, a case, and a holding tape. The electrode assembly further includes a bottom surface, which is supported by an inner bottom surface of the case, two end faces in a lamination direction, which are joined to the bottom face, two side surfaces, which are joined to the bottom surface and intersect with the end surfaces, and two corner sections, which are formed from the bottom surface and the side surfaces. Each corner section includes a chamfered section, and a border section between the chamfered section and the bottom surface. The holding tape covers the border section from the bottom surface in a direction parallel to the bottom surface and orthogonal to the stacking direction, further inward of the electrode assembly than the side surface.

12 Claims, 3 Drawing Sheets

(51) Int. Cl.
  *H01M 2/10* (2006.01)
  *H01M 10/0585* (2010.01)
  *H01G 11/12* (2013.01)
  *H01G 11/80* (2013.01)
  *H01G 11/82* (2013.01)
  *H01M 2/02* (2006.01)
  *H01M 10/34* (2006.01)

(52) U.S. Cl.
  CPC .......... *H01G 11/82* (2013.01); *H01M 2/0237* (2013.01); *H01M 2/1077* (2013.01); *H01M 2/34* (2013.01); *H01M 10/0585* (2013.01); *H01M 10/345* (2013.01); *H01M 2220/20* (2013.01); *Y02E 60/10* (2013.01); *Y02E 60/13* (2013.01); *Y02T 10/70* (2013.01)

(56) References Cited

U.S. PATENT DOCUMENTS

| | | | |
|---|---|---|---|
| 6,844,109 B2 | 1/2005 | Xing et al. | |
| 2008/0311469 A1* | 12/2008 | Kim | H01M 2/021 429/185 |
| 2011/0052975 A1 | 3/2011 | Lee | |
| 2011/0200872 A1* | 8/2011 | Kogure | H01M 10/0413 429/186 |
| 2012/0135285 A1* | 5/2012 | Iwama | H01M 2/26 429/94 |
| 2014/0186685 A1* | 7/2014 | Kwon | H01M 2/18 429/160 |
| 2014/0302384 A1* | 10/2014 | Park | H01M 2/08 429/179 |
| 2015/0340663 A1* | 11/2015 | Minagata | H01M 2/0237 429/163 |

FOREIGN PATENT DOCUMENTS

| | | |
|---|---|---|
| JP | 2002-343350 A | 11/2002 |
| JP | 2003-187873 A | 7/2003 |
| JP | 2003-187874 A | 7/2003 |
| JP | 2010-80324 A | 4/2010 |
| JP | 2013-196961 A | 9/2013 |
| WO | WO 2014002647 * | 1/2014 |

OTHER PUBLICATIONS

International Search Report for PCT/JP2014/060668 dated Jul. 22, 2014.

\* cited by examiner

ACCUMULATOR DEVICE

CROSS REFERENCE TO RELATED APPLICATIONS

This application is a National Stage of International Application No. PCT/JP2014/060668 filed Apr. 15, 2014, claiming priority based on Japanese Patent Application No. 2013-085972, filed Apr. 16, 2013, the contents of all of which are incorporated herein by reference in their entirety.

TECHNICAL FIELD

The present invention relates to an electricity storage device including holding tape that holds positive electrodes, negative electrodes, and separators together.

BACKGROUND ART

Electric vehicles (EVs) and plug-in hybrid vehicles (PHVs) are equipped with rechargeable batteries, which are electricity storage devices that store electric power for drive motors. For example, a rechargeable battery includes an electrode assembly, in which positive electrodes and negative electrodes are layered, and active material layers are formed on opposite surfaces of the positive and negative electrodes. Separators are located between the positive electrodes and the negative electrodes. The electrode assembly is accommodated in a case. The case of a rechargeable battery is often made of a metal with high durability, such as aluminum. In manufacturing such a case, curved sections inevitably form in the edges of the inner bottom surface. Thus, electrode assemblies for rechargeable batteries have been proposed that are shaped to avoid interference with the curved sections of the case. For example, Patent Document 1 describes an electrode assembly that includes positive and negative electrodes, each including chamfered corners.

PRIOR ART DOCUMENTS

Patent Documents

Patent Document 1: Japanese Laid-Open Patent Publication No. 2002-343350

SUMMARY OF THE INVENTION

Problems that the Invention is to Solve

When a metal case is used for a rechargeable battery, the case needs to be insulated from the electrode assembly. Thus, an insulative film is placed between the electrode assembly and the case. The inner bottom surface of the case supports the bottom surface of the electrode assembly, which includes positive and negative electrodes having chamfered corners. When the rechargeable battery is vibrated or tilted, stress may be concentrated in the sections of the insulative film that are in contact with the border sections between the bottom surface and the chamfered corners and damage the insulative film.

It is an objective of the present invention to provide an electricity storage device that prevents damage to insulation in an electrode assembly that includes a chamfered section in a corner section.

Means for Solving the Problems

To achieve the foregoing objective and in accordance with one aspect of the present invention, an electricity storage device is provided that includes an electrode assembly, a case, an insulative layer, and holding tape. The electrode assembly includes a plurality of positive electrodes, a plurality of negative electrodes, and a plurality of separators. The positive electrodes and the negative electrodes are alternately layered in a lamination direction, and the separators insulate the positive electrodes from the adjacent negative electrodes. The case includes an inner bottom surface and accommodates the electrode assembly. The insulative layer is located between the electrode assembly and the case. The holding tape holds the positive electrodes, the negative electrodes, and the separators together. The electrode assembly includes a bottom surface, which is supported by the inner bottom surface of the case, two end surfaces in the lamination direction, which are connected to the bottom surface, two side surfaces, which are connected to the bottom surface and intersect with the end surfaces, and two corner sections formed by the bottom surface and the side surfaces. Each corner section includes a chamfered section and a border section between the chamfered section and the bottom surface. The holding tape covers, from the bottom surface, the border section on an inner side of the side surfaces in the electrode assembly in a direction that is parallel to the bottom surface and perpendicular to the lamination direction.

MODES FOR CARRYING OUT THE INVENTION

Figure 1:
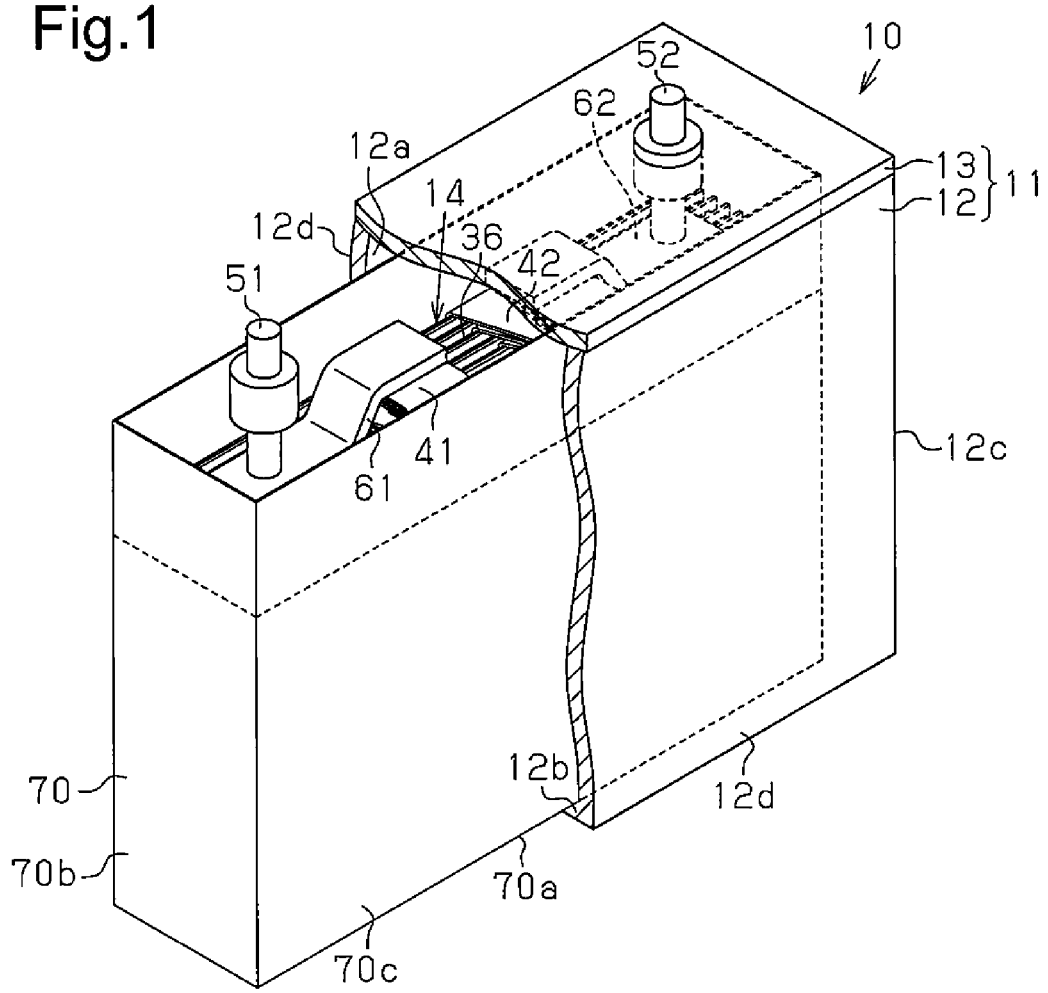
FIG. 1 is a partially cutaway perspective view showing a rechargeable battery according to one embodiment.

Referring to FIGS. 1 to 5, one embodiment of a rechargeable battery, which serves as an electricity storage device, will now be described.

As shown in FIGS. 1 to 5, a rechargeable battery 10 is a lithium-ion rechargeable battery and includes a metal case 11, which forms the outer covering of the rechargeable battery 10. The case 11 includes a receptacle 12, which has an opening 12a in one surface, and a lid 13, which closes the opening 12a. The receptacle 12 has the shape of a rectangular box with a bottom. The receptacle 12 includes a rectangular bottom plate 12b, transverse walls 12c, which project from two opposite transverse edges of the bottom plate 12b, and longitudinal walls 12d, which project from two opposite longitudinal edges of the bottom plate 12b. In the inner surface of the receptacle 12, the sections of the transverse walls 12c, which are connected to the bottom plate 12b, form curved sections R, which have arcuate cross-sections. Accordingly, the distance between the curved sections R of the two transverse walls 12c gradually increases toward the opening 12a. The case 11 accommodates an electrode assembly 14, which serves as a charging and discharging element, and electrolyte solution (not shown), which serves as an electrolyte. The electrode assembly 14 as a whole is rectangular in conformance with the receptacle 12, which has a rectangular inner space.

Figure 2:
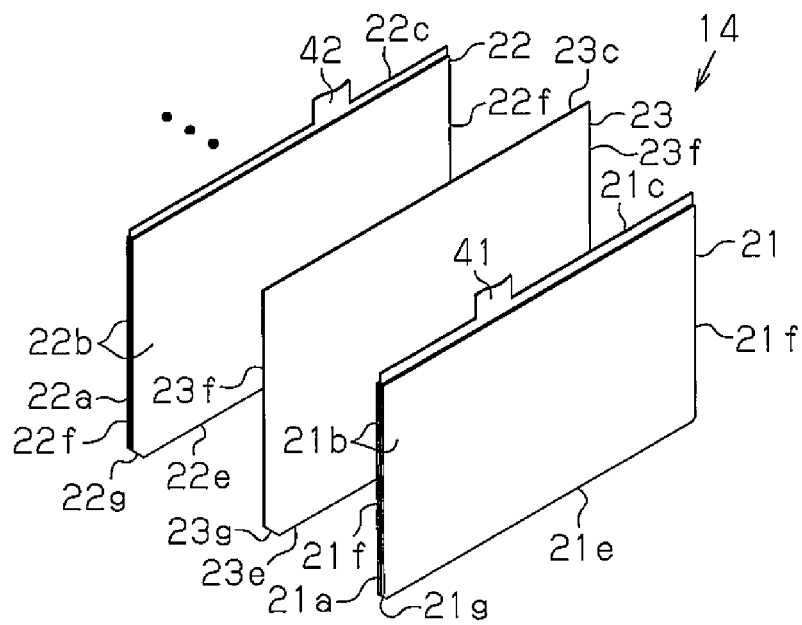
FIG. 2 is an exploded perspective view showing components of an electrode assembly.

As shown in FIG. 2, the electrode assembly 14 includes a plurality of positive electrodes 21, a plurality of negative electrodes 22, and a plurality of separators 23. The positive and negative electrodes 21 and 22 are rectangular sheets. The separators 23 are formed by porous films that are permeable by conductive ions (lithium ions). The positive electrodes 21 and the negative electrodes 22 are alternately layered, and the separators 23 insulate the positive electrodes 21 from the negative electrodes 22. In the following descriptions, the direction in which the positive and negative electrodes 21 and 22 are layered in the electrode assembly 14 will be referred to as a lamination direction.

Each positive electrode 21 includes rectangular positive metal foil 21a (aluminum foil in the present embodiment) and rectangular positive active material layers 21b, which are located on opposite sides (surfaces) of the positive metal foil 21a. The positive electrode 21 includes a positive electrode-less section, in which a positive active material is not provided. The positive electrode-less section extends along an edge of the positive electrode 21. A positive collector tab 41 projects from a part of a first edge (an upper edge) 21c of the positive electrode-less section.

The positive electrode 21 includes a second edge 21e, which is opposite to the first edge 21c including the positive collector tab 41, and two third edges 21f, which connect the first edge 21c to the second edge 21e. The positive electrode 21 further includes positive chamfered sections 21g in the corner sections formed between the second edge 21e and the third edges 21f. The border sections between the positive chamfered sections 21g and the second edge 21e are angular.

Each negative electrode 22 includes rectangular negative metal foil 22a (copper foil in the present embodiment) and rectangular negative active material layers 22b located on opposite sides (surfaces) of the negative metal foil 22a. The negative electrode 22 includes a negative electrode-less section, in which a negative active material is not formed. The negative electrode-less section extends along an edge of the negative electrode 22. The negative electrode 22 includes a negative collector tab 42, which projects from a part of a first edge (an upper edge) 22c of the negative electrode-less section. The negative active material layers 22b are larger than the positive active material layers 21b so that the negative active material layers 22b cover the entire positive active material layers 21b.

The negative electrode 22 includes a second edge 22e, which is opposite to the first edge (the upper edge) 22c including the negative collector tab 42, and two third edges 22f, which connect the first edge 22c to the second edge 22e. The negative electrode 22 further includes negative chamfered sections 22g in the corner sections formed between the second edge 22e and the third edges 22f. The border sections between the negative chamfered sections 22g and the second edge 22e are angular.

Each separator 23 includes a first edge 23c, which corresponds to the positive collector tab 41 and the negative collector tab 42, a second edge 23e, which is opposite to the first edge 23c, and two third edges 23f, which connect the first edge 23c to the second edge 23e. The separator 23 includes separator chamfered sections 23g in the corner sections formed between the second edge 23e and the third edges 23f. The border sections between the separator chamfered sections 23g and the second edge 23e are angular.

The positive metal foil 21a and the negative metal foil 22a, excluding the tabs 41 and 42, have the same size as the separator 23. However, the dimension of the long sides (22c and 22e) of the negative active material layer 22b is greater than the dimension of the long sides (21c and 21e) of the positive active material layer 21b. In addition, the dimension of the short sides (22f) of the negative active material layer 22b is greater than the dimension of the short sides (21f) of the positive active material layer 21b. That is, the negative active material layer 22b has greater longitudinal and transverse dimensions than the positive active material layer 21b. Further, the dimension of the long sides (23c and 23e) of the separator 23 is greater than the dimension of the long sides (22c and 22e) of the negative active material layer 22b. In addition, the dimension of the short sides (23f) of the separator 23 is greater than the dimension of the short sides (22f) of the negative active material layer 22b. That is, the separator 23 has greater longitudinal and transverse dimensions than the negative active material layer 22b. In other words, the negative active material layer 22b is large enough to cover the surface of the positive active material layer 21b, and the separator 23 is large enough to cover both the surface of the negative active material layer 22b and the surface of the positive active material layer 21b.

Figure 3:
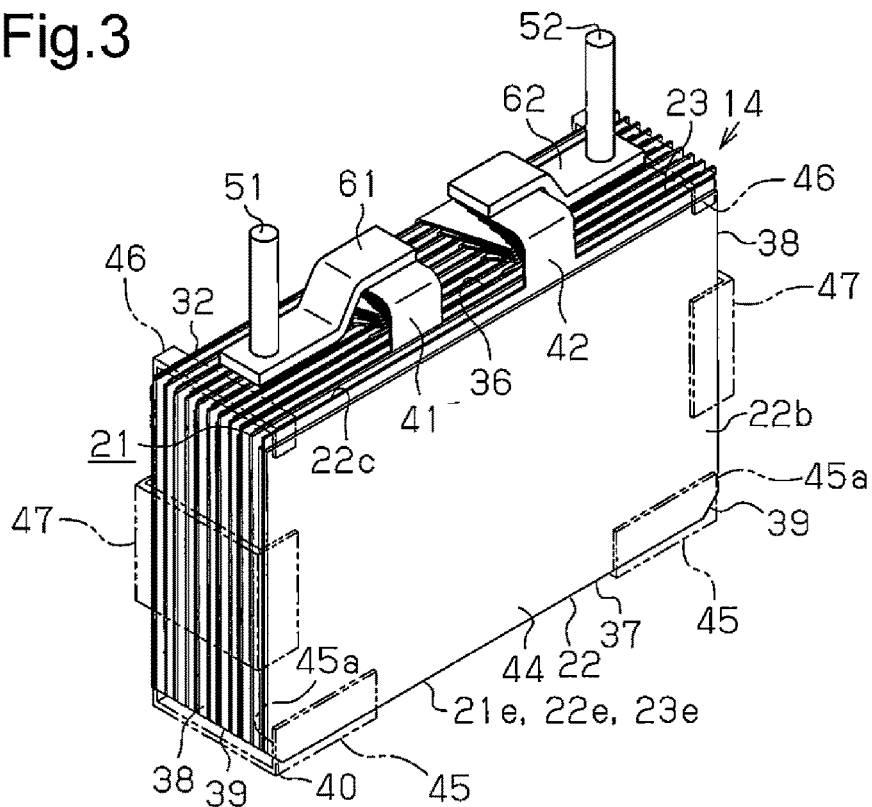
FIG. 3 is a perspective view showing the electrode assembly and holding tape.
Figure 4:
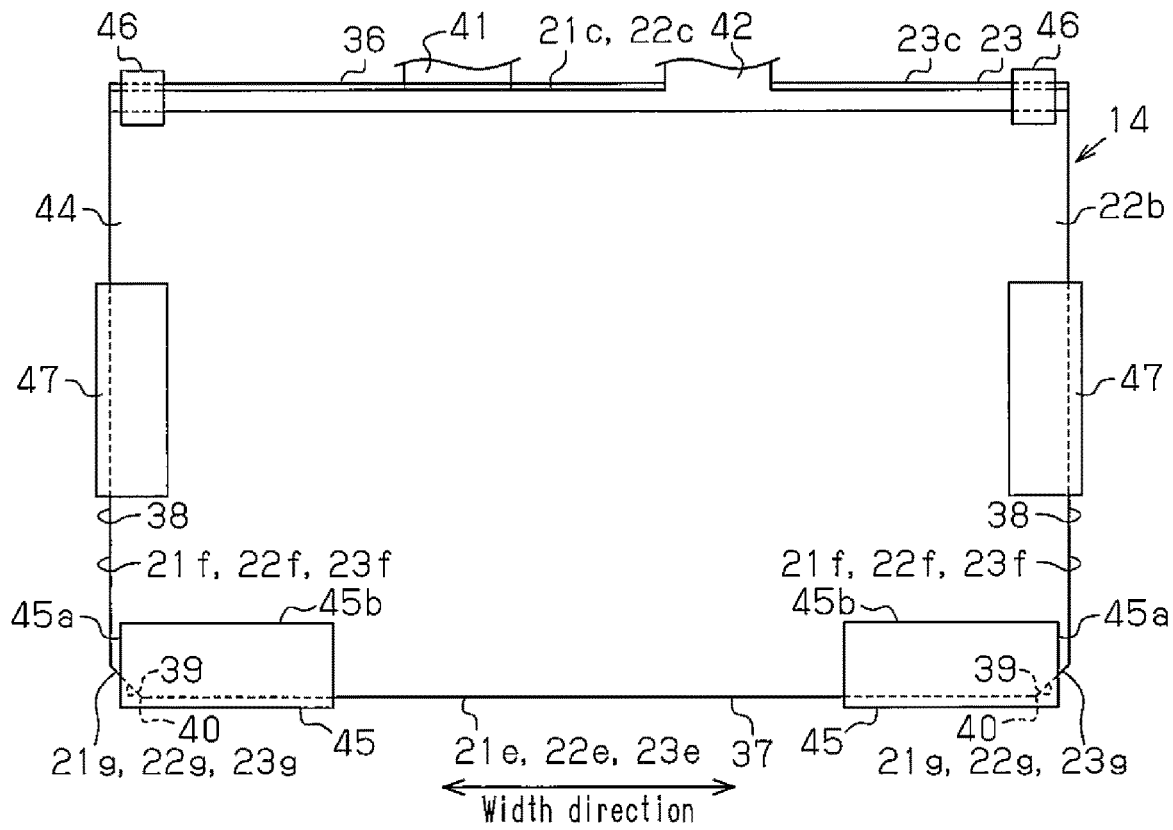
FIG. 4 is a front view showing the electrode assembly and the holding tape.

As shown in FIGS. 3 and 4, the positive electrodes 21, the negative electrodes 22, and the separators 23 are layered such that the positive collector tabs 41 are aligned in the lamination direction and the negative collector tabs 42 are aligned in the lamination direction and positioned so as not to overlap with the positive collector tabs 41. The electrode assembly 14 includes a tab-side edge surface 36, which is formed by the collection of the first edges 21c, 22c and 23c. On the tab-side edge surface 36, all the positive collector tabs 41 of the electrode assembly 14 are collected (layered) and bent. The sections of the positive collector tabs 41 that overlap one another are welded to electrically connect the positive collector tabs 41 together. The positive collector tabs 41 are connected to a positive conductor 61, which is connected to a positive terminal 51 to take out electricity from the electrode assembly 14.

In a similar manner, all the negative collector tabs 42 of the electrode assembly 14 are collected (layered) and bent on the tab-side edge surface 36. The sections of the negative collector tabs 42 that overlap one another are welded to electrically connect the negative collector tabs 42 together. The negative collector tabs 42 are connected to a negative conductor 62, which is connected to a negative terminal 52 to take out electricity from the electrode assembly 14.

The electrode assembly 14 also includes a bottom surface 37, which is formed by the collection of the second edges 21e, 22e and 23e. The bottom surface 37 is opposite to the tab-side edge surface 36. In addition, the electrode assembly 14 includes two side surfaces 38, each formed by a collection of third edges 21f, 22f and 23f. The electrode assembly 14 also includes two end surfaces 44 in the lamination direction. The side surfaces 38 and the end surfaces 44 are connected to the bottom surface 37. The end surfaces 44 intersect with (specifically, extend perpendicular to) the lamination direction. The side surfaces 38 are the two surfaces of the four surfaces connected to the bottom surface 37 other than the end surfaces 44 and are parallel to the lamination direction and intersect with (specifically, extend perpendicular to) the end surfaces 44.

The electrode assembly 14 further includes chamfered sections 39, each formed by a collection of positive chamfered sections 21g, negative chamfered sections 22g, and separator chamfered sections 23g. The chamfered sections 39 are located in the corner sections formed by the bottom surface 37 and the side surfaces 38. The chamfered sections 39 are flat surfaces extending in the lamination direction of the electrode assembly 14. The border sections (corner sections) 40 between the chamfered sections 39 and the bottom surface 37 are angular. The border sections 40 between the chamfered sections 39 and the bottom surface 37 extend linearly in the lamination direction.

Two pieces of first holding tape 45 are joined to the bottom surface 37 of the electrode assembly 14 so as to cover the respective border sections 40. Each piece of the first holding tape 45 substantially has the shape of a letter U when viewed in a direction that is parallel to the bottom surface 37 and perpendicular to the lamination direction. In the following descriptions, the direction that is parallel to the bottom surface 37 and perpendicular to the lamination direction will be referred to as a width direction. The two pieces of the first holding tape 45 are separated in the width direction. Further, each piece of the first holding tape 45 is located on the inner side of the associated side surface 38 in the electrode assembly 14. In the width direction, the first holding tape 45 covers, from the bottom surface 37, a part of the chamfered section 39, the border section 40, and a part of the bottom surface 37 on the inner side of the side surface 38 in the electrode assembly 14.

Figure 5:
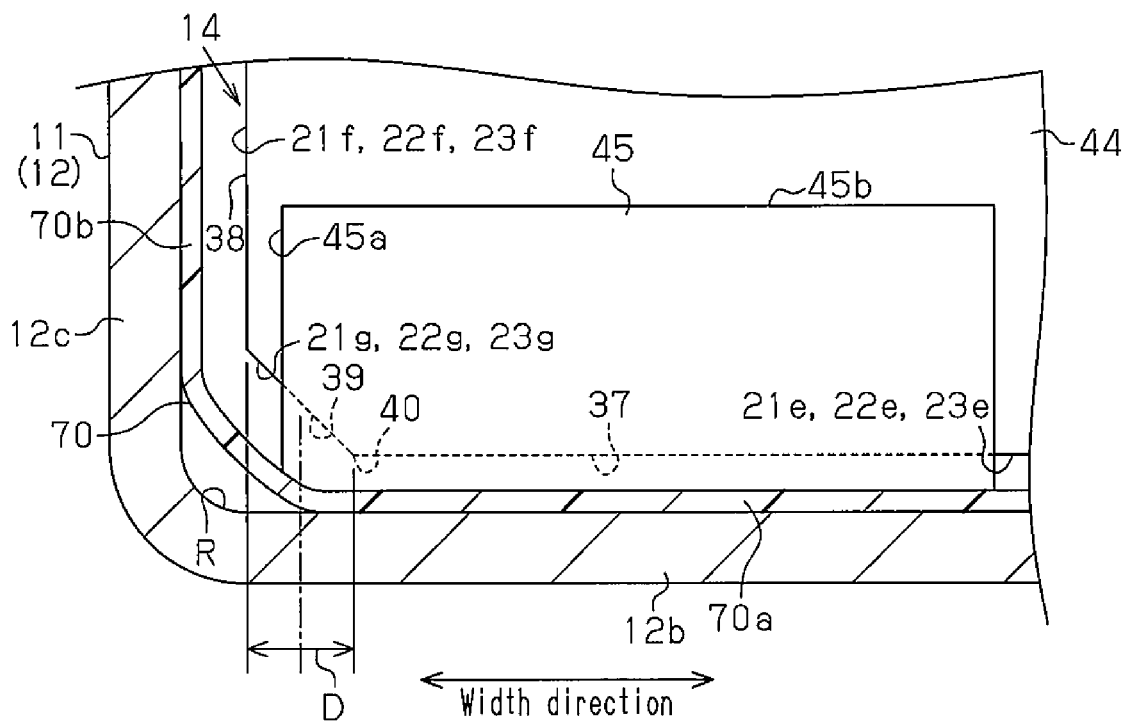
FIG. 5 is an enlarged cross-sectional view showing an inner bottom surface of a case.

As shown in FIG. 5, the distance between the border section 40 and the side surface 38 in the width direction, that is, the dimension of the chamfered section 39 in the width direction, is defined as a distance D. Each piece of the first holding tape 45 includes an edge 45a, which is closer to the side surface 38 of the electrode assembly 14. The edge 45a is closer to the side surface 38 than the midpoint of the distance D between the border section 40 and the side surface 38 is to the side surface 38. Further, in the width direction, the dimension of the first holding tape 45 is greater than the distance D, that is, the dimension of the chamfered section 39. When L represents the dimension of the first holding tape 45, H represents the dimension of the chamfered section 39 in a direction perpendicular to the bottom surface 37, and T represents the thickness of the electrode assembly 14 in the lamination direction, the dimension L of the first holding tape 45 satisfies L≥2H+T. In other words, the first holding tape 45 extends on the end surfaces 44 beyond the chamfered sections 39 in a direction perpendicular to the bottom surface 37.

As shown in FIGS. 3 and 4, two pieces of second holding tape 46 are joined to the tab-side edge surface 36 of the electrode assembly 14 so as to cover the tab-side edge surface 36. Each piece of the second holding tape 46 substantially has the shape of an inverted letter U when viewed in the width direction. In addition, third holding tape 47 is joined to each side surface 38 of the electrode assembly 14 so as to cover the side surface 38.

The pieces of the first to third holding tapes 45 to 47 hold the positive electrodes 21, the negative electrodes 22, and the separators 23 together so that movements of the positive electrodes 21, the negative electrodes 22, and the separators 23 in the lamination direction and all directions along the end surfaces 44 are limited. Further, the pieces of first to third holding tapes 45 to 47 are made of a material that resists breakage. For example, each piece of the first to third holding tapes 45 to 47 includes a base made of polypropylene (PP) or polyphenylene sulfide (PPS) and an adhesive layer located on one surface of the base.

As shown in FIGS. 1 and 5, a box-shaped insulative film 70, which serves as an insulative layer, insulates the electrode assembly 14 from the case 11. The insulative film 70 includes a bottom covering section 70a, which insulates the bottom surface 37 of the electrode assembly 14 from the inner bottom surface (bottom plate 12b) of the receptacle 12. The insulative film 70 also includes second covering sections 70b, which are located between the side surfaces 38 of the electrode assembly 14 and the transverse walls 12c of the receptacle 12, and third covering sections 70c, which are located between the end surfaces 44 of the electrode assembly 14 and the longitudinal walls 12d of the receptacle 12.

As shown in FIG. 5, the electrode assembly 14 is accommodated in the receptacle 12 such that its bottom surface 37 is not placed on the curved sections R. The electrode assembly 14 is supported on the inner bottom surface (the bottom plate 12b) of the receptacle 12, with the bottom covering section 70a of the insulative film 70 sandwiched between the electrode assembly 14 and the receptacle 12. The parts of the bottom covering section 70a of the insulative film 70 that are connected to the second covering sections 70b are deformed to conform to the curved sections R. The first holding tape 45 is also deformed to conform to the curved sections R. Further, the first holding tape 45 is located between the bottom covering section 70a and the bottom surface 37 of the electrode assembly 14, and the third holding tape 47 is located between the second covering sections 70b and the side surfaces 38 of the electrode assembly 14.

Operation of the rechargeable battery 10 will now be described.

The pieces of the first holding tape 45 cover the border sections 40 of the electrode assembly 14. Consequently, the first holding tape 45 reduce any concentration of force applied to the insulative film 70 by the border sections 40 when the rechargeable battery 10 vibrates and causes the electrode assembly 14 to vibrate in the case 11, for example.

The pieces of the first holding tape 45 do not project outward beyond the side surfaces 38 of the electrode assembly 14. Thus, protecting the border sections 40 by joining the first holding tape 45 to the electrode assembly 14 does not enlarge the outer shape of the electrode assembly 14.

The above described embodiment has the following advantages.

(1) In the electrode assembly 14, which includes the chamfered sections 39 in the corner sections, the pieces of the first holding tape 45 cover the border sections 40 between the chamfered sections 39 and the bottom surface 37. Thus, the first holding tape 45 reduces any concentration of force applied to the insulative film 70 by the border sections 40. This limits damages to the insulative film 70 and maintains the insulation between the electrode assembly 14 and the case 11.

(2) In the electrode assembly 14, the pieces of the first holding tape 45 are located on the inner side of the side surfaces 38 in the width direction of the electrode assembly 14 and do not project beyond the side surfaces 38 of the electrode assembly 14. Thus, the pieces of the first holding tape 45, which protect the border sections 40, do not increase the dimension of the electrode assembly 14 in the width direction.

(3) The pieces of the first holding tape 45 cover the border sections 40 between the chamfered sections 39 and the bottom surface 37. The pieces of the first holding tape 45, which are joined to the electrode assembly 14 to hold the positive electrodes 21, the negative electrodes 22, and the separators 23, are also used to cover the border sections 40. Thus, the covering of the border sections 40 is achieved without increasing the number of components of the electrode assembly 14.

(4) The border sections 40 between the bottom surface 37 and the chamfered sections 39 are angular. Such chamfered sections 39 can easily be manufactured with high shape accuracy compared to when the border sections 40 are curved, but there is a high probability that the border sections 40 will damage any members that come in contact with the border sections 40. The pieces of the first holding tape 45, which cover the border sections 40, limit damage to the bottom plate 12b, which would otherwise be caused by the border sections 40.

(5) The inner bottom surface of the receptacle 12 includes the curved sections R in the two transverse walls 12c. When the electrode assembly 14 is accommodated, its bottom surface 37 is not placed on the curved sections R, and the chamfered sections 39 face the curved sections R. Here, the first holding tape 45 is deformed in conformance to the curved sections R, protecting the chamfered sections 39 from the curved section R.

(6) The edge 45a of the first holding tape 45 is closer to the associated side surface 38 than the midpoint between the border section 40 and the side surface 38 in the width direction of the electrode assembly 14. This ensures that the first holding tape 45 covers the border section 40.

(7) In the width direction, the dimension of the first holding tape 45 is greater than the dimension of the chamfered section 39. This ensures that the first holding tape 45 covers the border section 40, even when the first holding tape 45 is placed with its edge 45a close to the side surface 38 of the electrode assembly 14.

(8) When L represents the dimension of the first holding tape 45, H represents the dimension of the chamfered section 39 in a direction perpendicular to the bottom surface 37, and T represents the thickness of the electrode assembly 14 in the lamination direction, the dimension of the first holding tape 45 satisfies $L \geq 2H+T$. That is, on the end surfaces 44, the first holding tape 45 extends beyond the chamfered sections 39 in a direction perpendicular to the bottom surface 37. This allows the entire distal edges 45b of the first holding tape 45 to adhere to the end surfaces 44 of the electrode assembly 14 regardless of the attachment position of the first holding tape 45 in the width direction. This limits peeling of the first holding tape 45.

The above described embodiment may be modified as follows.

The chamfered sections 39 may be curved from the bottom surface 37 to the side surfaces 38 to have an arcuate shape.

The pieces of the second and third holding tape 46 and 47 may be omitted.

The edge 45a of the first holding tape 45 may be closer to the bottom surface 37 than the midpoint between the border section 40 and the side surface 38 in the width direction of the electrode assembly 14.

The negative metal foil, the positive metal foil, and the separators may have different sizes. For example, the electrode assembly may include pouch-shaped separators that accommodate positive metal foil and are alternately layered with negative metal foil. In this case, although pieces of the holding tape are not directly in contact with the positive metal foil, the holding tape can hold the positive electrodes, the negative electrodes, and the separators together.

The first holding tape 45 may be joined to the electrode assembly 14 such that the edge 45a is located on the border section 40.

A single piece of first holding tape 45, which is extended in the width direction, may cover the two border sections 40.

The insulation between the electrode assembly 14 and the case 11 does not have to be provided by the insulative film 70. Any structure may be employed as long as an insulative layer is formed between the electrode assembly 14 and the case 11. For example, the inner surface of the case 11, excluding the weld section to the lid 13, may be coated with insulative plastic.

The rechargeable battery 10 may be a rechargeable battery other than a lithium ion battery, such as a nickel metal hydride battery.

The electricity storage device is not limited to the rechargeable battery 10 and may be a capacitor, such as an electric double layer capacitor or a lithium-ion capacitor.

The invention claimed is:

1. An electricity storage device comprising:
an electrode assembly including a plurality of positive electrodes, a plurality of negative electrodes, and a plurality of separators, wherein the positive electrodes and the negative electrodes are alternately layered in a lamination direction, and the separators insulate the positive electrodes from the adjacent negative electrodes;
a case, which includes an inner bottom surface and accommodates the electrode assembly;
an insulative layer located between the electrode assembly and the case; and
holding tape, which holds the positive electrodes, the negative electrodes, and the separators together, wherein
the electrode assembly includes a bottom surface, which is supported by the inner bottom surface of the case, two end surfaces in the lamination direction, which are connected to the bottom surface, two side surfaces, which are connected to the bottom surface and intersect with the end surfaces, and two corner sections formed by the bottom surface and the side surfaces,
each of the two corner sections includes a chamfered section and a border section between the chamfered section and the bottom surface, and
the holding tape covers the border section from the bottom surface, and
in a width direction of the electrode assembly, the holding tape includes an outermost edge which is disposed between the side surface and the border section, so that the holding tape does not cover an entirety of the chamfered section.

2. The electricity storage device according to claim 1, wherein the holding tape covers a portion of the chamfered section from the bottom surface.

3. The electricity storage device according to claim 1, wherein the border section is angular.

4. The electricity storage device according to claim 1, wherein the insulative layer is an insulative film, which is located between the bottom surface of the electrode assembly and the inner bottom surface of the case and insulates the electrode assembly from the case.

5. The electricity storage device according to claim 1, wherein, in a direction that is parallel to the bottom surface and perpendicular to the lamination direction, a dimension of the holding tape is greater than a dimension of the chamfered section.

6. The electricity storage device according to claim 1, wherein a dimension of the holding tape satisfies $L \geq 2H+T$, where L represents the dimension of the holding tape, H represents a dimension of the chamfered section in a direction perpendicular to the bottom surface, and T represents a thickness of the electrode assembly in the lamination direction.

7. The electricity storage device according to claim 1, wherein the holding tape extends on each end surface of the electrode assembly and beyond the chamfered section in a direction perpendicular to the bottom surface.

8. The electricity storage device according to claim 1, wherein the electricity storage device is a rechargeable battery.

9. The electricity storage device according to claim 1, wherein the holding tape is a strip of tape, and has a shape of a letter U when viewed in a direction that is parallel to the bottom surface and perpendicular to the lamination direction.

10. The electricity storage device according to claim 1, wherein the outermost edge of the holding tape is positioned closer to the side surface of the electrode assembly than a midpoint of a distance between the side surface and the border section.

11. The electricity storage device according to claim 1, wherein the chamfered section at each of the two corner sections is formed by chamfered sections of the plurality of negative electrodes and the plurality of separators that are alternately layered.

12. The electricity storage device according to claim 1, wherein the outermost edge of the holding tape does not project beyond the side surface of the electrode assembly in the width direction.

* * * * *